No. 751,104. PATENTED FEB. 2, 1904.
T. PFISTER.
METHOD OF MANUFACTURING CLOISONNÉ WARE.
APPLICATION FILED MAY 28, 1902.
NO MODEL.
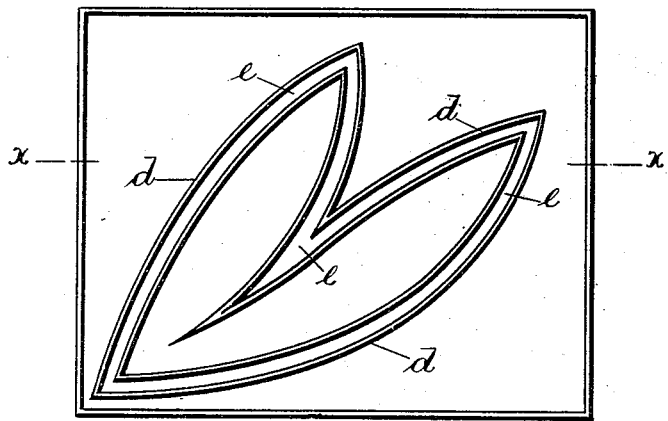
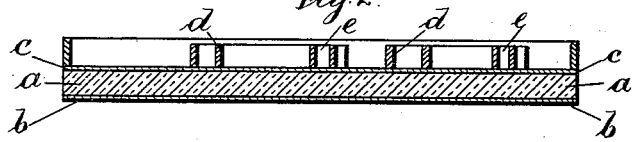
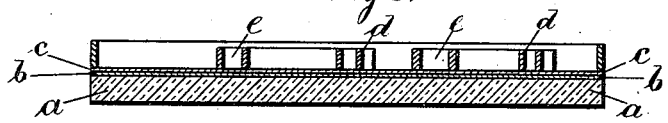

No. 751,104. Patented February 2, 1904.

UNITED STATES PATENT OFFICE.

THEOPHIL PFISTER, OF LONDON, ENGLAND.

METHOD OF MANUFACTURING CLOISONNÉ WARE.

SPECIFICATION forming part of Letters Patent No. 751,104, dated February 2, 1904.

Application filed May 28, 1902. Serial No. 109,272. (No specimens.)

*To all whom it may concern:*

Be it known that I, THEOPHIL PFISTER, a citizen of the United States, residing in London, England, have invented an Improvement in Methods of Manufacturing Cloisonné Ware, of which the following is a specification.

My invention relates to a new method in the manufacture of cloisonné ware, and is equally useful in the manufacture of all articles in which cloisons or contour-strips are used, such as cloisonné glass, cloisonné mosaic, cloisonné enamel, and the like. Heretofore in the manufacture of articles of this nature it has been difficult to turn out a commercially-successful product owing to the expense attached to the shaping of the cloisons, which were commonly secured to the base and remained a permanent part of the finished product, thus necessitating the forming of new cloisons or contour-strips for every article manufactured, even of the same design.

The principal object of my invention is the method of producing cloisonné ware in which the cloisons do not form a permanent part of the article and which when once made may be used repeatedly to produce innumerable articles of the same design, thereby effecting a great saving in the cost of manufacture of such articles, and which will hereinafter be more particularly described.

In the drawings, Figure 1 is a plan view of a piece of cloisonné ware, illustrating my improved method of manufacturing the same. Fig. 2 is a section on $xx$, Fig. 1; and Fig. 3 is a horizontal section showing a modified method of manufacturing.

In carrying out my invention I employ a plate $a$ of suitable material, preferably of glass, the surface of which may be flat or curved, according to the form of the article to be produced. The design to be followed may be placed under the glass plate $a$, as shown in Fig. 2, and the glass plate coated with a layer of suitable material, such as wax or gelatin $c$, or the design may be drawn on a piece of paper $b$, one side of which is caused to adhere to the upper surface of the glass plate $a$, as in Fig. 3, and the other side provided with a coating of wax, gelatin, or similar substance of low specific heat and which may or may not be soluble in water. The cloisons or contour-strips $d$ are then shaped to form the design required and secured to the surface of wax or gelatin on the paper or glass used as a foundation-plate, to which they adhere sufficiently. These cloisons $d$ may be made of wire strips or may be cast or stamped up, or in some instances it may be preferable to employ strings of threaded beads, as described in United States Letters Patent No. 639,862, December 26, 1899. Experience has taught me that it is preferable to use these cloisons in duplicate— that is, to make the outline of the design in two cloisons or contour-strips running parallel and adjacent to each other, so that there is a narrow space $e$ between them, as shown in Fig. 1. The cloisons now having been shaped to outline the design and temporarily affixed to the prepared foundation-plate, as stated, the sides of the cloisons are oiled, so that the material will not adhere to them. A layer of tesseræ of glass, ceramic, marble, or other suitable material of the color necessary to carry out the design and of the material necessary for the purpose required are then filled in the cells of the cloisons, save in those cells between the two parallel cloisons or contour-strips which form the outlines of the design, to about three-quarters the height of the cloisons or contour-strips. Cement is then placed over the tesseræ in the cells and to about the depth of the contour-strips and allowed to set. Hot water is sprayed over the work, and the foundation-plate is heated to the required extent, and the cloisons are then readily lifted up and out of the work and placed under another foundation-plate to repeat the manufacture of an article of like design. The interstices left between the materials by the removal of the cloisons or contour-strips may now be filled in with tesseræ of the material used in the article or cement, putty, artificial stone, or other suitable material and the article completed, as is usual in the art of cloisonné glass or cloisonné mosaic or cloisonné enamel or the like.

To form a transparent article according to my invention, the glass foundation-plate is prepared, as hereinbefore described, with a layer of gelatin, the cloisons cemented to the plate, the tesseræ filled into the cells, and hot water sprayed over the work, then the cloisons are removed and the contour lines thus formed filled with a suitable contour material, cement poured over the design and allowed to set to fill up the interstices and to bind the particles together and to the plate, after which the cement is preferably removed from the top of the work.

I claim as my invention—

1. The herein-described method of producing cloisonné ware consisting in covering a foundation-plate with a layer of adhesive material, shaping the cloisons to form the design and temporarily affixing the same upon the adhesive material on the foundation-plate, partially filling the cells of the cloisons with tesseræ, removing the cloisons, and filling the spaces left empty by the removal of the cloisons, with a suitable filling material.

2. The herein-described method of producing cloisonné ware consisting in covering a foundation-plate with a layer of adhesive material, shaping the cloisons to form the design and temporarily affixing the same upon the adhesive material on the foundation-plate, partially filling the cells of the cloisons with tesseræ, placing cement over the tesseræ in the cells, spraying the work with hot water, heating the foundation-plate, removing the cloisons and filling the spaces between and around the configurations so formed, substantially as specified.

3. The herein-described method of producing cloisonné ware, consisting in covering a foundation-plate with wax, shaping the cloisons in parallel strips to form the design and temporarily affixing the same upon the wax on the foundation-plate, partially filling the cells of the cloisons with tesseræ, removing the cloisons and filling the spaces between the configurations left empty by the removal of the cloisons with a suitable filling material, substantially as specified.

4. The herein-described method of producing cloisonné ware consisting in covering a foundation-plate with wax, shaping the cloisons in parallel strips to form the design and temporarily affixing the same upon the wax on the foundation-plate, partially filling the cells of the cloisons with tesseræ, placing cement over the tesseræ in the cells, spraying hot water over the work, heating the foundation-plate, removing the cloisons, and filling the spaces between the configurations left empty by the removal of the cloisons, with a suitable filling material, substantially as specified.

5. The herein-described method of producing cloisonné ware consisting in covering a foundation-plate with wax, shaping the cloisons in parallel strips to form the design and temporarily affixing the same upon the wax on the foundation-plate, partially filling the cells of the cloisons with tesseræ, placing cement over the tesseræ in the cells, spraying hot water over the work, heating the foundation-plate, removing the cloisons, filling in the spaces left empty by the removal of the cloisons, with a suitable filling material, substantially as specified.

Signed by me this 15th day of May, 1902.

THEOPHIL PFISTER.

Witnesses:
 THEKLA NERMEE,
 HENRY R. MCGINNIS.